Figure 1:
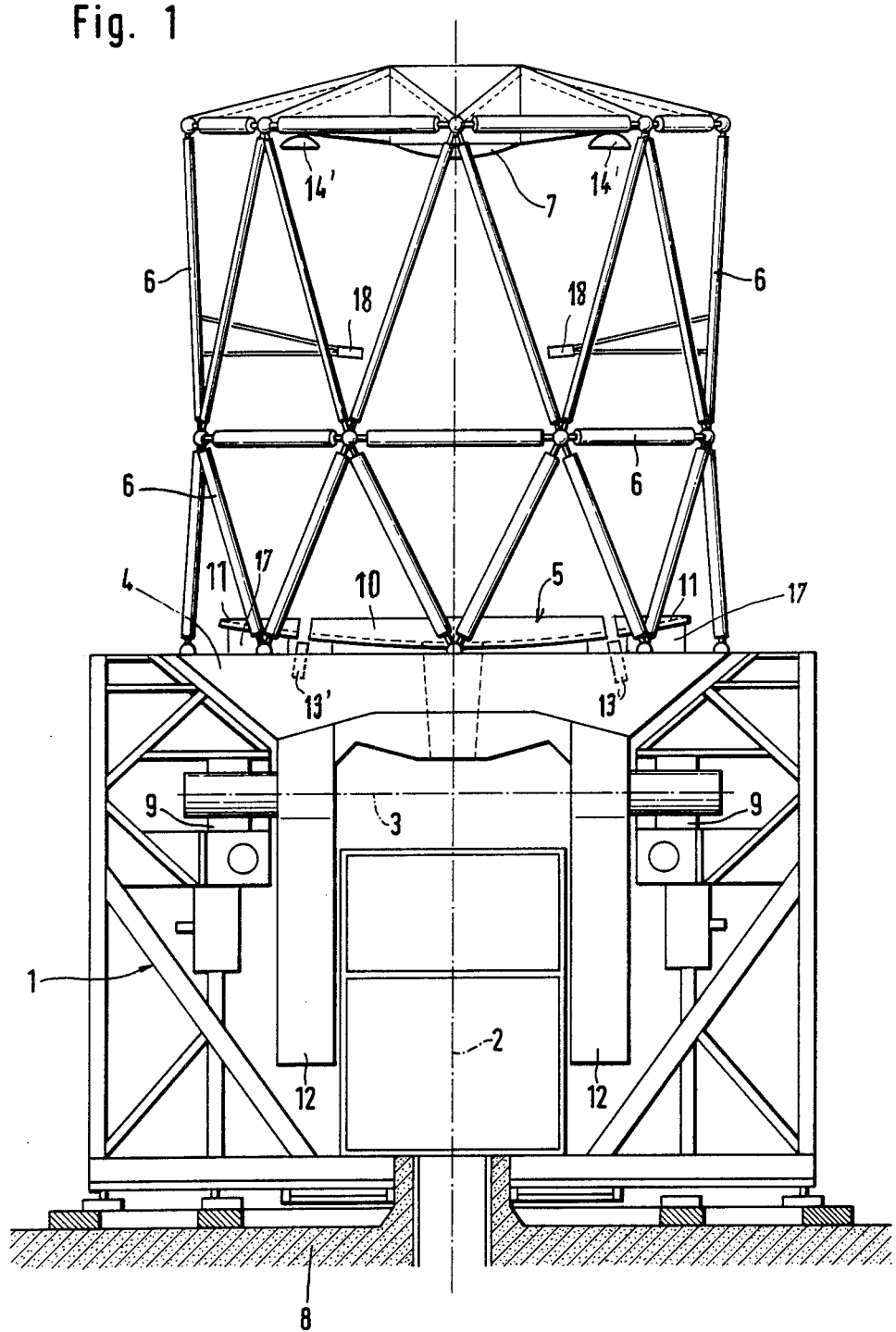

United States Patent [19]

Schmidt-Kaler

[11] Patent Number: 4,776,684
[45] Date of Patent: Oct. 11, 1988

[54] VERY LARGE OPTICAL TELESCOPE

[76] Inventor: Theodor Schmidt-Kaler, Steinhügel 105, D 5810 Witten, Fed. Rep. of Germany

[21] Appl. No.: 891,643

[22] Filed: Aug. 1, 1986

[30] Foreign Application Priority Data

Aug. 2, 1985 [DE] Fed. Rep. of Germany ....... 3527826

[51] Int. Cl.⁴ ............................................. G02B 5/10
[52] U.S. Cl. .................................... 350/613; 356/124
[58] Field of Search ............................... 356/123, 124; 250/201 R, 201 A; 350/619, 620, 607, 611, 613

[56] References Cited

PUBLICATIONS

Morrison, *SPIE Journal*, vol. 8, May 1970, pp. 107–118.
Meinel et al., "Mirrors: Fabrication, Processing, Testing and Tolerances", Publication Date Apr. 9–12, 1984.
Meinel et al., Applied Optics, vol. 19, No. 16, Aug. 15, 1980, "Minimum-Cost 4-m Telescope developed at Oct. 1979 Nanjing Study of . . . ".
Article entitled "Multiple Mirror Telescope (MMT) VI" by G. Burbidge et al. Advanced Technology Optical Telescopes, vol. 332, Mar. 11–13, 1982, Tucson, Ariz.

*Primary Examiner*—F. L. Evans
*Attorney, Agent, or Firm*—Banner, Birch, McKie & Beckett

[57] ABSTRACT

The invention concerns a very large optical telescope for observing light phenomena in the wave length region of about 0.3 to 30 or even to 300 μm. To realize a very large filled aperture it is proposed to arrange comparatively few individual reflectors around a central monolith, which can be individually adjusted optically to the central monolith which gives the reference wave front, by means of an adjustment device and/or bright starts. In this way manufacturing, polishing and transport of very large primary reflectors can be handled. Further deformations due to wind loads, temperature variations and other influences can be easily compensated. The primary reflector is carried by a yoke with the focus of the secondary mirror being in or near the elevation axis so that the usual mirror cell becomes superfluous, the beam moves only slowly with elevation and heavy instrumentation can be put directly near the focus.

2 Claims, 3 Drawing Sheets

VERY LARGE OPTICAL TELESCOPE

BACKGROUND OF THE INVENTION

The invention concerns a very large telescope for the observation of luminous phenomena in the visual, near ultraviolet and infrared spectral regions by means of a primary reflector, comprising several individual reflectors, a secondary reflector mounted in front of the primary reflector and a supporting structure including a yoke for the primary reflector and an auxiliary structure which holds the secondary reflector.

The instrument can as well be used for emitting high energy pulses.

Individual reflectors for the spectral domain of about 0.3 to 30 (or even 300) $\mu$m are subject to a natural limit of the diameter at about 5 to 7 meters due to the difficulties of fabrication, polishing, transport and handling. Although the manufacturing of larger monolith mirrors seems possible in principle, this is not proposed here considering the costs. There is, however, a demand for optical telescopes with diameters of 7 meters or more.

It has been tried to transgress this limit by composing the primary reflector of a very large optical telescope of a mosaic of many individual reflectors which can be manufactured in the usual way, and later on composed on a substructure to a single primary reflector. This proposal was at least made and published in 1984 by Meinel et al., Very Large Telescopes, their Instrumentation and Programs, International Astron. Union Colloq. No. 79 (Eds.: M. H. Ulrich, K. Kjär, Garching 1984, page 109). In this publication the construction of an extremely stiff and accurate substructure is proposed, providing support points for the relatively weak individual reflectors held by vacuum.

In such a concept of an optical large telescope the functions of support and of reflection are separated, but it is doubtful whether its advantage can be realized. The exact grinding of the support point structure requires extremely accurate machinery of the size of the primary reflector which could be very expensive. A further difficulty is the testing of the mosaic mirror. The adjustment, and testing requires a very accurate null-test mirror for the formation of a reference wave front which in this size is not available at present.

OBJECT OF THE INVENTION

It is the object of the invention to improve a very large optical telescope which allows with extreme accuracy diameters of the primary reflector which cannot be realized on the common machinery without enormous capital investments.

SUMMARY OF THE INVENTION

In order to fulfill this object the invention proposes an improvement concerning a large optical telescope for observing light phenomena in the visual, near ultraviolet and infrared spectral regions, having a primary reflector consisting of several individual reflectors, a secondary reflector for the focussing of the incoming light reflected by the primary reflector, the secondary reflector being held in position in front of the primary reflector by an auxiliary structure, a frame for carrying each individual reflector of the primary reflector and the auxiliary structure, a telescope carrier for supporting the frame, and a basement, the frame being pivotally mounted on the telescope carrier for a rotational movement around a horizontal axis and the carrier being pivotally mounted on the basement for a rotational movement around a vertical axis, the improvement comprising:

a yoke being used for the frame;

a monolith and several circular sector reflectors being used for the primary reflector;

an individual aligning structure under each sector reflector, each aligning structure being motorized;

at least one auxiliary light source for emitting a test and adjusting radiation;

several auxiliary light sensors for receiving the test and adjusting radiation;

and a control unit having an input and an output, the input being connected to the auxiliary light sensors and the output being connected to each individual aligning structure;

the test and adjusting radiation being directed to an area, one after another, of one of the circular sector reflectors abutting the central monolith and received after having been reflected by this area in one of the auxiliary light sensors, the control unit giving a computed signal corresponding to the sensed radiation to the corresponding individual aligning structure for an aligning adjustment in such a way that the radiation reflected by the area has the quality of a single wave front.

It is preferable to use a laser for the auxiliary light source. This auxiliary light source is either placed into the focus of the secondary reflector and adjustable to send a radiation onto the areas where the single circular sector reflectors abut the central monolith. The auxiliary light sensors are arranged in the number of areas in the vicinity of the secondary reflector.

Alternatively auxiliary light sources in the number of areas are placed in the middle of each area in the slit between each circular sector reflector and the central monolith. In this case auxiliary mirrors are held shortly above the area which reflect the auxiliary radiation emitted from the auxiliary light sources onto the area, from which area the radiation is reflected into the correspondingly arranged auxiliary light sensors.

The invention turns away from the usual procedure to adjust the primary reflector once and for ever, and proposes adjusting and correcting of the individual reflector areas during operation. In this way the thermal influences, deformations by inclinations, wind loads and other influences can be accounted for so that an optimal measuring condition is achieved at any time. As a consequence the requirements of stiffness of the yoke or supporting structure may be relaxed. Of course, only very small deformations are tolerated but the large telescope according to this invention should be able to compensate deformations which otherwise had to be tolerated. The auxiliary radiation for the adjustment of the individual reflectors into a total primary reflector preferably has an accuracy of $\lambda/8$ of the wave length. The adjustment is preferably carried out therefore by a laser system which starts from a mechanical deviation of for instance $\pm 15$ $\mu$m and improves, step by step the accuracy of the reflection surface by the application of shorter wave lengths onto the required accuracy.

Commonly, the adjusting process is carried out intermittently, for instance every ten minutes during the prosecution of light phenomena if the movements are not too great. During these periods there is hardly a displacement of the very large telescope so that at the end of this period possible deformations, if any, are small. Alternatively, a permanent adjustment may be applied whereby the auxiliary radiation must be filtered out of the observed radiation.

It is particularly advantageous to use in the center of the primary reflector as an individual reflector a monolith of quasi-classical type, having a diameter of approximately 5 to 7 m in the shape of a relatively thin meniscus. In this case the quasi-classical central monolith realizes a large-scale, exact reference wave front onto which the other individual reflectors can be adjusted much more easily and reliably. Furthermore it is possible to use this central monolith reflector even if the motorized individual aligning structures are not fully functioning although possibly with some losses of the quality of imaging from the other individual reflectors.

If it turns out to be difficult either to manufacture or to adjust exactly the individual reflectors surrounding the central monolith in the optical domain of the spectrum, the whole composite primary reflector can nevertheless be used in the infrared domain. This also allows a successive realization of the very large telescope starting from the central monolith, provided that the yoke or other supporting structure is designed to take up motorized individual aligning structures for carrying circular sector reflectors during the stepwise enlargement of the primary reflector.

The central monolith as well as the surrounding circular sector reflector can be supported passively, e.g. according to a well-known whiffle-tree system of the firm Carl Zeiss so that with varying elevation the supporting forces are chosen in such a way that the original figure of the surface is conserved. Active adjustments to the passive support system can be tested by means of observations of bright stars and incorporated into the control unit in which a positioning computer model taking into account elevation, wind loads, temperature etc., is incorporated. This procedure has the advantage that additional active support adjustments for instance on the basis of sensor measurements may become rather rare or relatively slow.

The individual reflectors surrounding the central monolith reflector, preferably in the form of circular sectors, can be manufactured from rather thin raw blocks of the same material having the same overall optical quality. Normally the outer sections of a monolith are very thick due to the casting process of the raw block. The division of the outer sections of the primary reflector into several circular sectors represents a cost-advantage since the deformations are small even though the final sector reflector is rather thin. The deformations vary like $D^4/d^2$ (where D is the diameter and d the thickness of the sector reflector).

A test and adjusting process comprises the following steps: The auxiliary light source emits a radiation which is directed towards the boundary zone between the monolith and an adjacent sector reflector. The reflected radiation is received by an auxiliary light sensor and the corresponding signal is conducted to the control unit. In this control unit the pictures of both part mirrors are compared and sensed whether the received radiation is a single wave front or not. In other words, a differential interferometry is made between both reflected radiations and in case of lacking interference the misaligned reflector is tilted and/or displaced against the central monolith to a certain extent. With the aid of a computed signal the motorized individual aligning structure is controlled to reduce the sensed disalignments by lifting and/or turning the supporting points of the sector reflector. As soon as the differential interferometric gauging signals a perfect alignment between this individual reflector and the monolith a neighbour sector reflector is controlled and may be adjusted. This control may be carried out by the same auxiliary light source and a further auxiliary light sensor in accordance with the design of the very large optical telescope according to the invention.

The positioning of the supporting points of the individual sector reflectors can be made in various ways. One of these possibilities consists of a magnetomechanical device. A steel rod used as one of at least three similar points is actuated by magnetostriction like a linear motor.

Another possibility is a hydraulic device consisting of a chamber with a flexible wall as the supporting point and a plunger which is actuated into the chamber or out of the chamber to create a flexion of the flexible wall member. The plunger may be moved by linear motor, by an excenter moved by a step motor or by similar suitable equipment.

Usually very large telescopes use, apart from the primary and secondary reflector, additional mirrors to turn round the light beam to heavy instrumentation which necessitates fixed location in a so called Coudé laboratory. The ensuing light losses by many reflections tend to be great. For further optimization the invention proposes as a separately protectable idea to put the focal area of the secondary reflector very near or onto the elevation axis of the telescope so that the focus remains always fixed in the telescope building and heavy instrumentation as well.

In this way at most three reflectors are required (the last one being a small mirror near the focal area compensating the motion of the elevation axis) to obtain a fixed beam relative to the telescope building which moves around the azimuth-axis.

Instead of the third reflector the beam from the secondary reflector may be channeled through light conductors, for instance fiber optics. The light losses are very small since the necessary fibers are rather short, and they are flexible so that instrumentation fixed in the building can be directly related to the Cassegrain focus. In this way simultaneous multi-object and multi-instrument observing is possible without sensible light losses. This supplements just the above mentioned type of very large telescope in a very efficient way.

BRIEF DESCRIPTION OF THE INVENTION

Figure 2:
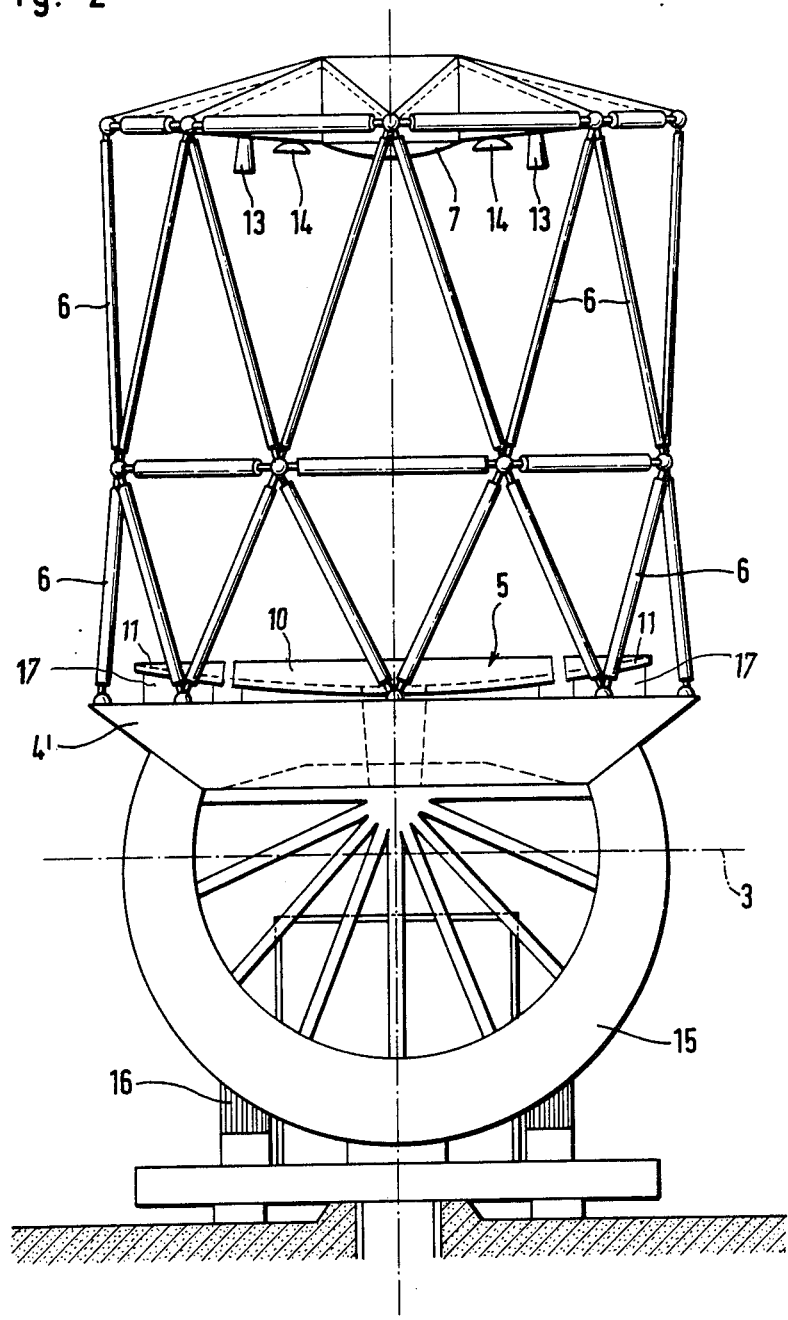
Figure 3:
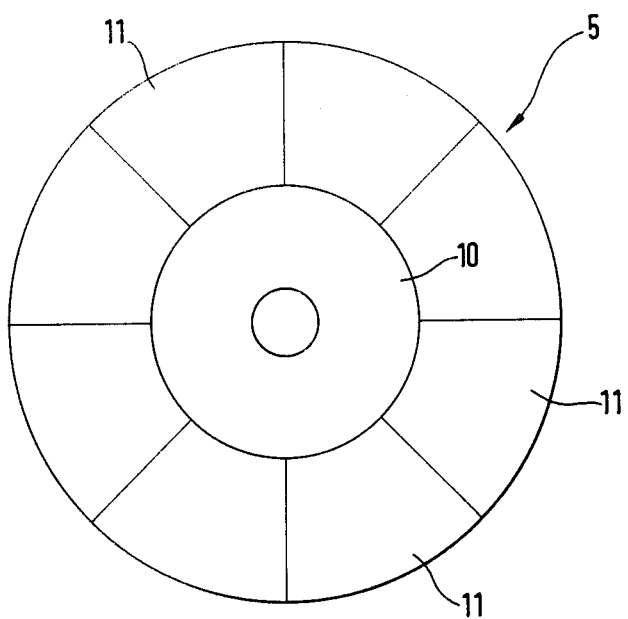
Figure 4:
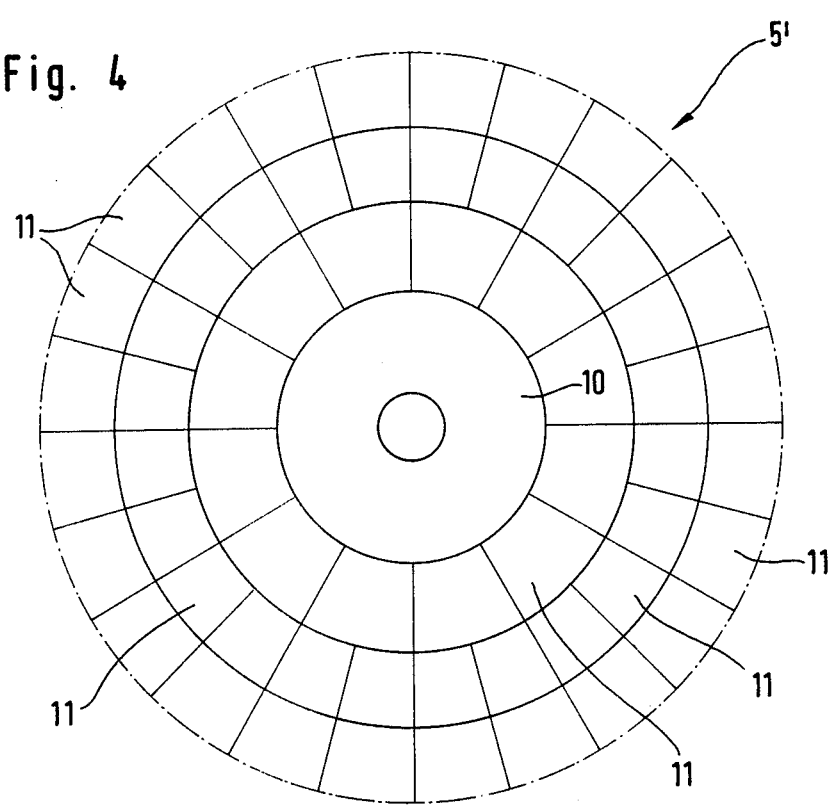

Embodiments of the invention are described in greater detail hereinafter relative to the drawings, wherein:

FIG. 1 shows a schematic side view of the very large telescope according to the invention at elevation 90°, FIG. 2 shows a view according to FIG. 1 of a further embodiment of a very large telescope, FIG. 3 shows a schematic view of an example of the primary reflector for the very large telescope of FIGS. 1 and 2 and FIG. 4 shows another example of such a primary reflector.

The very large telescope according to the invention shown in FIG. 1 is based on a telescope carrier 1 which is rotatable on the basement 8 around the azimuth-axis 2, for positioning in azimuth. For this purpose bearings and rails are disposed on the basements 8, which are known per se. In the upper part of the carrier 1 are bearings 9 for a yoke 4 which carries a primary reflector 5 and, by means of an optimized structure of rods 6, the secondary reflector 7. The yoke 4 and the supported components are counterbalancd by counterweights 12.

A modification of the yoke mounting is shown in FIG. 2. Two precise hydraulic bearings 16 as used for the horseshoe-type fork mountings 15 of the 4 m class telescopes carry the yoke 4'. Balancing counterweights become superfluous, the construction is even more compact and stiff.

In FIGS. 3 and 4 schematic application examples of the primary reflector are shown which has a central monolith 10 of about 5 to 7 m diameter around which further individual reflectors 11 are grouped, in these cases in the form of circular sectors. The size of the central monolith, and the size and form of the individual sector reflectors can be rather freely chosen according to manufacturing facilities. Each individual reflector is, in the first place, passively supported just like the central monolith 5. The adjustment of the individual sector reflectors 11 to the central monolith 5 is done by means of motorized adjustable supporting structures (diagrammatically shown at 17) together with auxiliary light sources 13 and auxiliary light sensors 14 which are arranged in the number of sector reflectors 11 in the vicinity of the secondary reflector 7.

The signals from the sensors 14 are computed in a control unit (not shown) which is integrated into the general instrumentation of the whole telescope. The adjustment is based on a differential interferometry and each sector reflector 11 is, during the adjustment procedure, tilted or displaced until the wave front of the reflected light from the monolith 5 and from the corresponding sector reflector 11 are coinciding. A similar adjustment is possible by using the light of bright stars, e.g. by a modified Hartmann test.

Together with FIG. 1 a modified arrangement of the auxiliary light sources 13' and sensors 14' is shown. In this particular case the light sources 13' are placed into each slit between a sector reflector 11 and the central monolith 5. The emitted radiation is reflected from an auxiliary mirror 18 (only two mirrors 18 are shown in FIG. 1) at a certain distance above the corresponding slit so that the radiation is thrown back onto the area comprising reflector sections of both reflectors 11 and 5. From this area the radiation is reflected into the auxiliary light sensors 14' arranged in the vicinity of the secondary reflector 7.

The light coming from the secondary reflector 7 has its focus area on or near the elevation axis 3, around which the unit consisting of the primary and secondary reflector, is rotatable for positioning in elevation. The light focussed here can be measured by instrumentation or falls onto the entrance pupils of fiber optics also a third movable reflector near the focus may be arranged.

What is claimed is:

1. Large optical telescope for observing light phenomenon in the visual, near ultraviolet and infrared spectral regions, having a primary reflector consisting of several individual reflectors, a secondary reflector for focusing the incoming light reflected by the primary reflector, the secondary reflector being held in position in front of the primary reflector by auxiliary structure, a frame for carrying each individual reflector of the primary reflector and the auxiliary structure, a telescope carrier for supporting the frame, and a basement, the frame being mounted on the telescope carrier for pivotal movement about a horizontal axis and the carrier being mounted on the basement for rotation about a vertical axis, the improvement comprising, a yoke being used for the frame, said primary reflector comprising a monolithic reflector fixed to said yoke on an axis normal to the plane of said yoke, circular sector reflectors surrounding said monolithic reflector on said yoke, and individual motorized aligning means under each of said sector reflectors.

2. Telescope according to claim 1 in which said secondary reflector has a focus at said horizontal axis, allowing multi-object and multi-instrument operation in the focal area.

* * * * *